Jan. 15, 1935.  R. B. LINCOLN  1,987,691
WELDING APPARATUS
Filed Jan. 14, 1933  3 Sheets-Sheet 2

WITNESSES:
E. A. McCloskey
R. R. Lockwood

INVENTOR
Rollo B. Lincoln
BY
G. M. Crawford
ATTORNEY

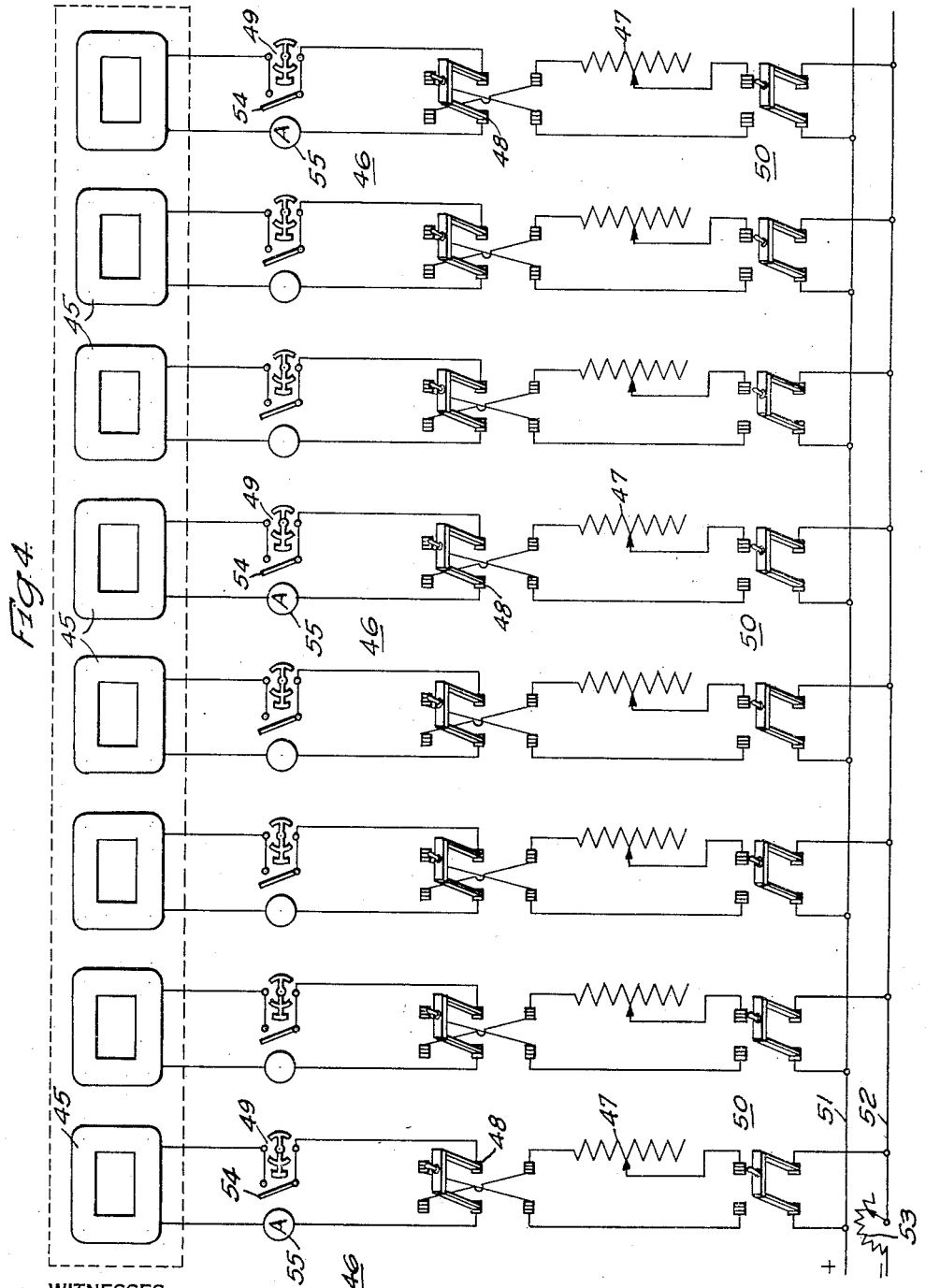

Patented Jan. 15, 1935

1,987,691

UNITED STATES PATENT OFFICE 1,987,691

WELDING APPARATUS

Rollo B. Lincoln, Wilkinsburg, Pa., assignor to Westinghouse Electric & Manufacturing Company, East Pittsburgh, Pa., a corporation of Pennsylvania Application January 14, 1933, Serial No. 651,706

12 Claims. (Cl. 219—8)

My invention relates, generally, to welding apparatus and it has particular relation to electric arc welding apparatus.

The object of my invention, generally stated, is the provision of apparatus for stabilizing the operation of a welding arc which shall be simple and efficient in operation and readily and economically manufactured and installed.

A more specific object of my invention is to provide for stabilizing the operation of an electric arc which is used for performing a welding operation in the vicinity of material having varying reluctance.

Another object of my invention is to provide for presetting the flux density which may be applied for influencing the action of a welding arc at any point along its path.

Still another object of my invention is to provide for reversing the polarity of a magnetic field which may be applied for stabilizing the operation of a welding arc.

A further object of my invention is to provide for applying a magnetic field of predeterminable flux density and polarity at any point along the path of a welding arc in accordance with the movement of the welding arc.

Other objects of my invention will, in part, be obvious and, in part, appear hereinafter.

My invention, accordingly, is disclosed in the embodiment here shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which Figure 1 is a view, in side elevation, showing a welding blank in section, of arc welding apparatus embodying the features of my invention;

Fig. 4 is a diagrammatic view showing certain of the electrical connections for the welding apparatus illustrated in Fig. 1.

Figure 1:
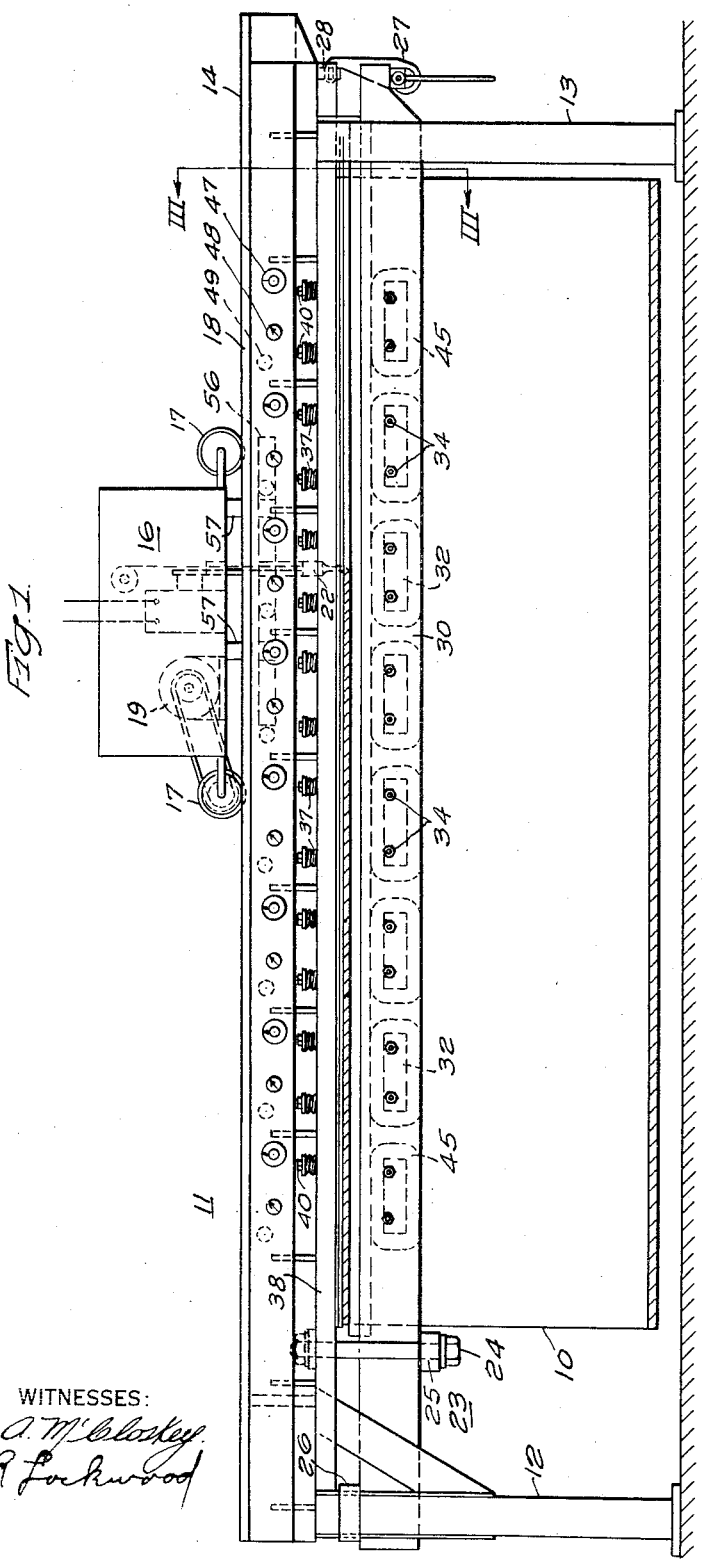
Figure 2:
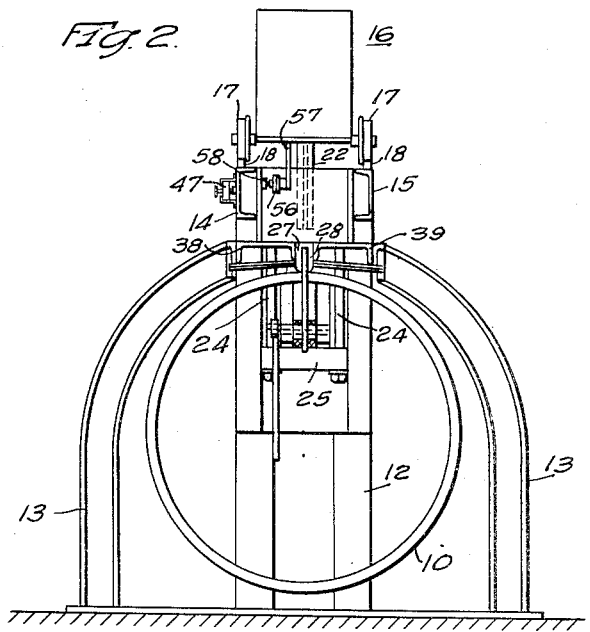
Fig. 2 is a view, in end elevation, of the apparatus shown in Fig. 1.

Referring to Figs. 1 and 2 of the drawings, the reference character 10 designates a welding blank in the form of a pipe which is placed in a frame, shown generally at 11, to permit the welding of the abutting edges. The frame 11 comprises the rear supporting legs 12 and the front supporting legs 13 that are connected by means of the longitudinally extending beams 14 and 15.

In order to perform the welding operation, a welding head, illustrated generally at 16, is provided with wheels 17 for travelling along a track 18 that is placed on top of the beams 14 and 15, as illustrated. Since the welding head 16 may be of any suitable type well known in the art for feeding an electrode to perform a welding operation along the abutting edges of the blank 10, a detailed description thereof will not be given in this specification.

A motor 19 is provided in the welding head and is suitably connected to the wheels 17 for driving the welding head along the frame 11. It will be readily apparent that any other suitable apparatus may be used for driving the welding head 16 along the blank 10 and, further, it will also be apparent that the welding head 16 may be held stationary and the welding blank 10 moved relative thereto for effecting the welding operation if necessary or desirable.

The welding head 16 is arranged, as illustrated, for feeding a welding electrode 21 through a nozzle 22 to the abutting edges of the blank 10. However, it will be apparent that my invention may be used in connection with apparatus which manually feeds a welding electrode for performing the welding operation and also with apparatus in which a carbon electrode is used either with or without a welding wire being fed into the arc to provide additional weld metal along the edges of the joint being welded.

In order to hold the blank 10 in position so that the welding operation may be readily performed, a back-up bar, shown generally at 23, is mounted in the frame 11 at the left hand end by means of bolts 24 and a yoke 25. As illustrated in the drawings, the back-up bar 23 is provided with an extension at the left hand end that is disposed beneath a cross member 26 on the rear legs 12 so that the back-up bar 23 is supported as a canti-lever.

In order to support the right hand end of the back-up bar 23 after the welding blank 10 is placed in position, a latch 27 is provided. The latch 27 is arranged to engage a suitable eye 28 carried by the beams 14 and 15 so that the back-up bar 23 may be secured in a level position.

Figure 3:
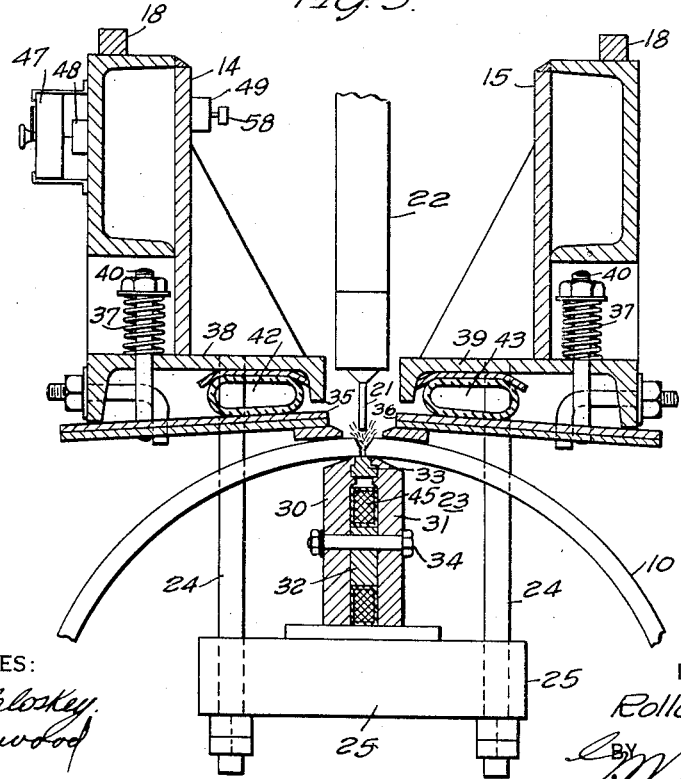
Fig. 3 is an enlarged sectional view of the welding apparatus taken along the line III—III of Fig. 1, showing in detail the construction of the back-up bar.

As illustrated more clearly in Fig. 3 of the drawings, the back-up bar 23 comprises a pair of longitudinally extending side members 30 and 31 which are spaced apart by means of pole pieces 32 and which extend along and underneath the edges of the blank 10 that are to be welded together.

With a view to providing a backing for the weld metal between the edges of the joint and for another purpose which will be hereinafter set forth, a backing strip 33 composed of non-magnetic material such as copper or brass is disposed between longitudinal members 30 and 31 and in engagement with the edges of the blank 10 to be welded. The longitudinal members 30 and 31 and the pole pieces 32 are constructed of magnetic material such as steel in order to provide the required strength and also for a purpose which will be apparent hereinafter. The longitudinal members 30 and 31 are secured together by means of through bolts 34 so that the back-up bar 23 is formed into a unitary structure.

In order to insure that the edges of the blank 10 will remain in alinement during the performance of the welding operation, holding fingers 35 and 36 are provided along each side of the joint and are held out of engagement therewith by means of springs 37 which are disposed, as illustrated, along channel members 38 and 39 that are secured to the under side of the beams 14 and 15. The springs 37 are connected to the fingers 35 and 36 by means of bolts 40 that pass through suitable openings in the channel members 38 and 39 and which may be secured to the fingers 35 and 36 in any suitable manner.

In order to apply pressure to the fingers 35 and 36 to hold the edges of the joint in a central position along the back-up bar 23, extensible hose members 42 and 43 are provided, as illustrated, between the fingers 35 and 36 and the channels 38 and 39, respectively. Suitable air connections and valves, not shown, are provided for applying air pressure to the hoses 42 and 43 as desired so that the blank 10 may be securely clamped in position for performing the welding operation and then released after the welding operation has been completed.

In the customary construction of arc welding machines, it is desirable to use members comprising magnetic material, such as steel, in order to obtain the required strength of the parts to resist the relatively high forces that may be applied to them. It has been found that the use of a welding arc in the vicinity of the magnetic material comprising the structure for supporting the blank being welded is erratic. The erratic operation of the welding arc is due to the varying reluctance paths along the path of the welding arc and also to magnetic fields which are set up in the magnetic structure surrounding the arc because of the flow of welding current therethrough.

In order to correct these difficulties which result in the erratic operation of the welding arc or what is commonly known as "arc blow", it has been proposed to position a winding around the electrode which is used for performing welding operation and to conduct the welding current through this winding thereby applying a concentrated magnetic field around the welding arc, the density of which is a function of the welding current. Other methods for arc blow compensation include the use of windings disposed around various parts of the beams 14 and 15 or conductors disposed longitudinally or underneath the back-up bar 23 and through which the welding current is arranged to flow.

All of the prior art devices that have been used for preventing arc flow have the inherent disadvantage that they are comparatively inflexible in their application for the reason that the effects on the operation of the welding arc are not constant but rather are exceedingly variable when different welding currents are used or different shapes of welding blanks are being welded. In addition, certain parts of the supporting structure in the vicinity of the path of the welding arc tend to become more or less permanently magnetized and the magnetic field created thereby is variable from time to time.

In order to overcome the objections to the apparatus of the prior art which has been used for preventing "arc blow", I have provided for applying a relatively large number of independently controlled magnetic fields along the path of the welding arc and have further provided for varying the flux density and polarity of each of the fields and for simultaneously controlling the effects of all of them.

With a view to providing the desired magnetic flux along the path of the weld which may be adjusted to counteract any erratic operation of the welding arc as it is moved along the edges of the blank 10, the back-up bar 23 is provided with windings 45 that are located between the longitudinal members 30 and 31 and around the pole pieces 32. Since the longitudinal members 30 and 31 and the pole pieces 32 are constructed of magnetic material while the backing strip 33 is constructed of non-magnetic material, the magnetic field that is generated by the windings 45 is concentrated in the vicinity of the welding arc between electrode 21 and the edges of the blank 10 being welded.

In order to energize the field windings 45, each is provided with an independent control circuit 46 which is more clearly illustrated in Fig. 4 of the drawings. As illustrated, each of the control circuits 46 comprises a variable resistor 47, a reversing switch 48 and a toggle switch 49. A switch 50 is provided for connecting each of the control circuits 46 to a pair of conductors 51 and 52 that are connected through a variable resistor 53 to any suitable source of direct current. In order to shunt out the toggle switch 49, a switch 54 is provided, as illustrated. In addition, an ammeter 55 is provided in each of the control circuits 46 in order to indicate to an operator the amount of current that is flowing in the field winding 45 individual thereto.

It is desirable to energize only field windings 45 that are in the immediate vicinity of the welding arc in order to economize the power consumption. For this purpose, a switch contacting shoe 56 is provided and is carried underneath the welding head 16 by means of suitable brackets 57 to engage the operating levers 58 of the toggle switches 49 that are disposed along the inner side of the beam 14.

In operation, the latch 27 is lowered and the welding blank 10 is placed in position on the back-up bar 23. The latch 27 is then secured in the position illustrated in the drawings and air pressure is applied to the hoses 42 and 43 so that the welding blank 10 will be securely held in position. As taught by previous experience, the operator will adjust the various resistors 47 to provide the desired flux density along the path of the welding arc to prevent its erratic operation. Under certain conditions, it may even be necessary to operate some of the reversing switches 48 especially near the ends of the seam being welded due to the variations in the effects of the magnetic fields in these positions on the operation of the welding arc.

The motor 19 in the welding head 16 is energized to drive it along the frame 11. As the welding head 16 progresses along the work, the toggle switches 49 are operated by means of the shoe 56 so that the windings 45 in the vicinity of the welding arc are energized while the remaining windings either ahead or behind the welding head 16 are deenergized. In certain instances it may be desirable for the operator to adjust the effects of the field windings 45 while the welding operation is being performed. This may be readily accomplished by varying the adjustable resistors 47 to obtain the desired arc compensation.

In the event that it is desired to maintain the windings 45 continually energized, the switches 54 may be operated to the closed positions thereby short circuiting the toggle switches 49 and rendering them ineffective to control the energization of the windings 45.

If it is desired to control the energization of all of the field windings 45 simultaneously, the adjustable resistor 53 may be moved to the desired position thereby effecting a simultaneous change in the flux which is generated by each of the field windings 45.

It will be apparent that other means may be used for effecting the operation of the toggle switches 49 in accordance with the movement of the welding head 16, thus suitable photo-electric devices may be used to successively energize and de-energize the field windings 45 in accordance with the movement of the welding head 16, as will be readily understood by those skilled in the art. It will also be apparent that a greater or a lesser number of field windings 45 may be used, than have been illustrated, in order to effect a desired control of the operation of the welding arc.

For the convenience of the operator, the variable resistors 47 and the switches 48 and 49 are illustrated as being mounted along the beam 14 so that they are adjacent to the field winding 45 with which they are associated. The control switches 50 and the common control variable resistor 53 may be mounted in any convenient location. It will be understood, however, that the controls for regulating the magnetic field generated by the field windings 45 may be positioned at any suitable location, as desired, although it is preferable to locate them as illustrated in the drawings.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. Arc welding apparatus comprising, in combination, means for feeding a welding electrode to perform an arc welding operation along the abutting edges of a blank to be welded, support means for securing the blank in welding position relative to the electrode feeding means, a plurality of field windings disposed along the edges of the blank being welded for creating a magnetic field along the path of the welding arc, and adjustable means individual to each of the field windings for changing the intensity of the magnetic field created thereby.

2. Arc welding apparatus comprising, in combination, means for feeding a welding electrode to perform an arc welding operation along juxtaposed edges of a blank, support means for securing the blank in welding position, a plurality of field windings disposed along the edges of the blank being welded for generating a magnetic field along the path of the welding arc, adjustable means individual to each of the field windings for changing the intensity of the magnetic field generated thereby, and additional adjustable means for simultaneously varying the effect of each of the field windings.

3. Welding apparatus comprising, in combination, a welding head for feeding a welding electrode to perform an arc welding operation along the abutting edges of a welding blank, means for moving the welding head relative to the edges of the blank being welded, a plurality of field windings disposed along the edges of the blank for generating a magnetic field along the path of the welding arc, circuit means for connecting the field windings to a current source, and control means operated by the welding head as it is moved along the edges of the blank for opening and closing the connection of each of the field windings to the current source.

4. Arc welding apparatus comprising, in combination, a welding head for feeding a welding electrode to perform an arc welding operation along the abutting edges of parts to be welded, a frame for supporting the welding head in operative relation to the joint being welded, means for driving the welding head along the frame, a support structure for securing the parts in welding position, a plurality of electro-magnetic means disposed along the edges of the parts being welded for generating a magnetic flux along the path of the welding arc, circuit means individual to each electro-magnetic means for effecting connection to a current source, switch means included in the circuit means, and actuating means carried by the welding head for operating the switch means to successively energize and de-energize the electro-magnetic means as the welding head is moved along the frame.

5. A back-up bar for use in performing an arc welding operation along the abutting edges of a joint in a welding blank comprising, in combination, a pair of spaced support members, a backing strip disposed between one pair of edges of the support members for engaging the edges of the joint to be welded, and a plurality of field windings disposed between the support members for generating magnetic flux along the line of the weld.

6. A back-up bar for use in performing an arc welding operation along the abutting edges of a joint in a welding blank comprising, in combination, a pair of spaced support members composed of magnetic material, a backing strip composed of non-magnetic material and disposed between one pair of edges of the support members for engaging the edges of the joint to be welded, a plurality of pole pieces located between the support members, clamping means extending through the support members and pole pieces, and a field winding disposed around each of the pole pieces for generating magnetic flux along the line of the weld.

7. Apparatus for controlling the operation of an electric arc used for performing a welding operation along the abutting edges of a blank comprising, in combination, a back-up bar including a pair of spaced support members extending along the blank, a backing strip disposed between the support members to engage the edges of the blank, and a plurality of field windings located between the support members for generating magnetic flux along the line of the weld, and circuit means for connecting the field windings to a source of direct current, said circuit means including a variable resistor individual to each of the field windings for changing the density of the magnetic field generated thereby.

8. Apparatus for controlling the operation of an electric arc used for performing a welding operation along the abutting edges of a blank comprising, in combination, a back-up bar including a pair of spaced support members extending along the blank, a backing strip disposed between the support members to engage the edges of the blank, and a plurality of field windings located between the support members for generating magnetic flux along the line of the weld, and circuit means for connecting the field windings to a source of direct current, said circuit means including a variable resistor and a reversing switch individual to each field winding for changing the density and polarity of the magnetic field generated thereby.

9. Apparatus for controlling the operation of an electric arc used for performing a welding operation along the abutting edges of a blank comprising, in combination, a back-up bar including a pair of spaced support members extending along the blank, a backing strip disposed between the support members to engage the edges of the blank, and a plurality of field windings located between the support members for generating magnetic flux along the line of the weld, circuit means for connecting the field windings to a source of direct current, said circuit means including a variable resistor and a reversing switch individual to each field winding for changing the density and polarity of the magnetic field generated thereby, circuit-closing means individual to each field winding for effecting the energization of the field windings, and means synchronized with the movement of the welding arc along the edges being welded for operating said circuit closing means.

10. Apparatus for controlling the operation of an electric arc used for performing a welding operation along the abutting edges of a blank comprising, in combination, a welding head for feeding a welding electrode to maintain the arc, driving means for moving the welding head along the work, a back-up bar including a pair of spaced support members extending along the blank, a backing strip disposed between the support members to engage the edges of the blank and a plurality of field windings located between the support members for generating magnetic flux along the line of the weld, circuit means individual to each field winding for connecting the field windings to a direct current source, each of the circuit means comprising a variable resistor for presetting the flux density generated by the field winding individual thereto, a reversing switch for changing the polarity of the magnetic field, and a switch operable in accordance with the movement of the welding head along the joint for effecting the successive energization and de-energization of the field windings thereby subjecting the welding arc to the influence of a magnetic field of predetermined flux density and polarity throughout its path.

11. Apparatus for controlling the operation of an electric arc used for performing a welding operation along the abutting edges of a blank comprising, in combination, a welding head for feeding a welding electrode to maintain the arc, driving means for moving the welding head along the work, a back-up bar including a pair of spaced support members extending along the blank, a backing strip disposed between the support members to engage the edges of the blank and a plurality of field windings located between the support members for generating magnetic flux along the line of the weld, circuit means individual to each field winding for connecting the field windings to a direct current source, each of the circuit means comprising a variable resistor for presetting the flux density generated by the field winding individual thereto, a reversing switch for changing the polarity of the magnetic field, a switch operable in accordance with the movement of the welding head along the joint for effecting the successive energization and de-energization of the field windings, and a variable resistor common to all of the circuit means for simultaneously varying the effects of the field windings and thereby to subject the welding arc to the influence of a magnetic field of predetermined flux density throughout its path.

12. Apparatus for controlling the operation of an electric arc used for performing a welding operation along the abutting edges of a blank comprising, in combination, a welding head for feeding a welding electrode to maintain the arc, driving means for moving the welding head along the work, a switch operating shoe carried by the welding head, a back-up bar including a pair of spaced support members extending along and supporting the blank, a backing strip disposed between the support members to engage the edges of the blank and a plurality of field windings located between the support members for generating magnetic flux along the line of the weld, circuit means individual to each field winding for connecting the field windings to a direct current source, each of the circuit means comprising a variable resistor for presetting the flux density generated by the field winding individual thereto, a reversing switch for changing the polarity of the magnetic field, a toggle switch disposed in the path of the switch operating shoe carried by the welding head for effecting the energization and de-energization of the field windings, and a variable resistor common to all of the circuit means for simultaneously varying the effects of the field windings and thereby subject the welding arc to the influence of a magnetic field of predetermined flux density throughout its path.

ROLLO B. LINCOLN.